H. WATKINS.
SAW SETTING MACHINE.
APPLICATION FILED JULY 10, 1907.
937,903.
Patented Oct. 26, 1909.
2 SHEETS—SHEET 2.
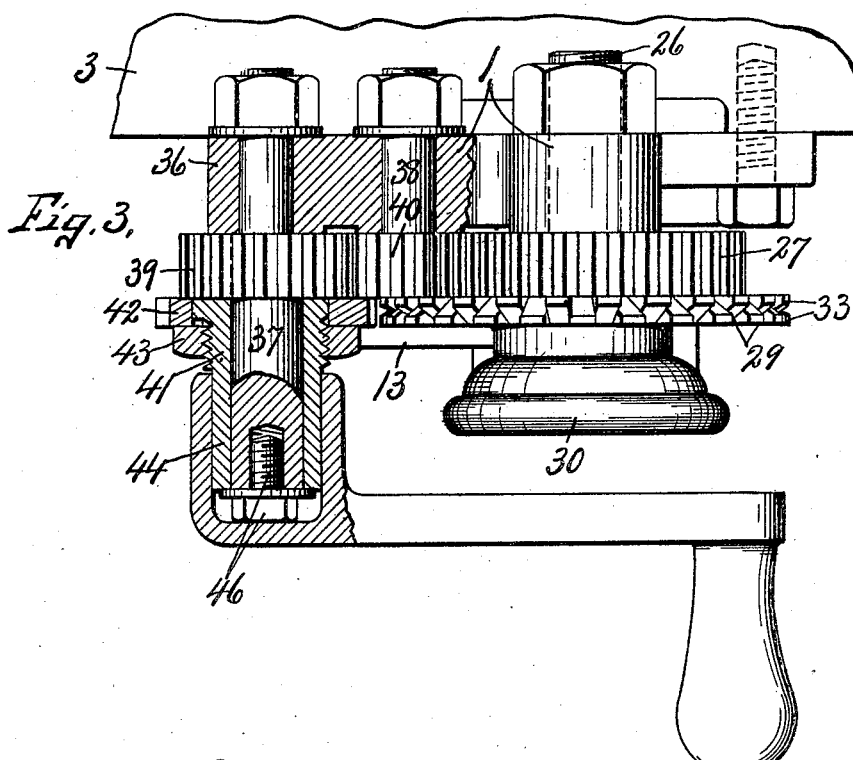
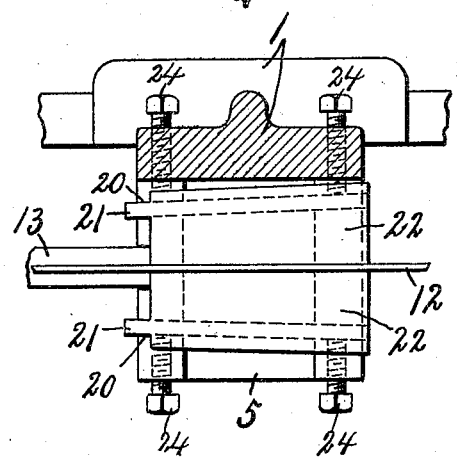
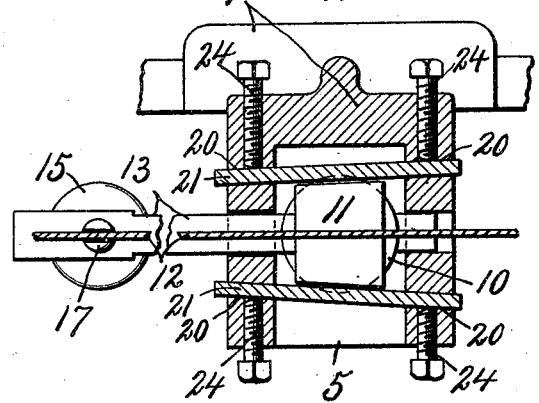
Witnesses.
J. C. Thomas
H. E. Chase
Inventor.
Harry Watkins
By
Howard P. Denison
Attorney.

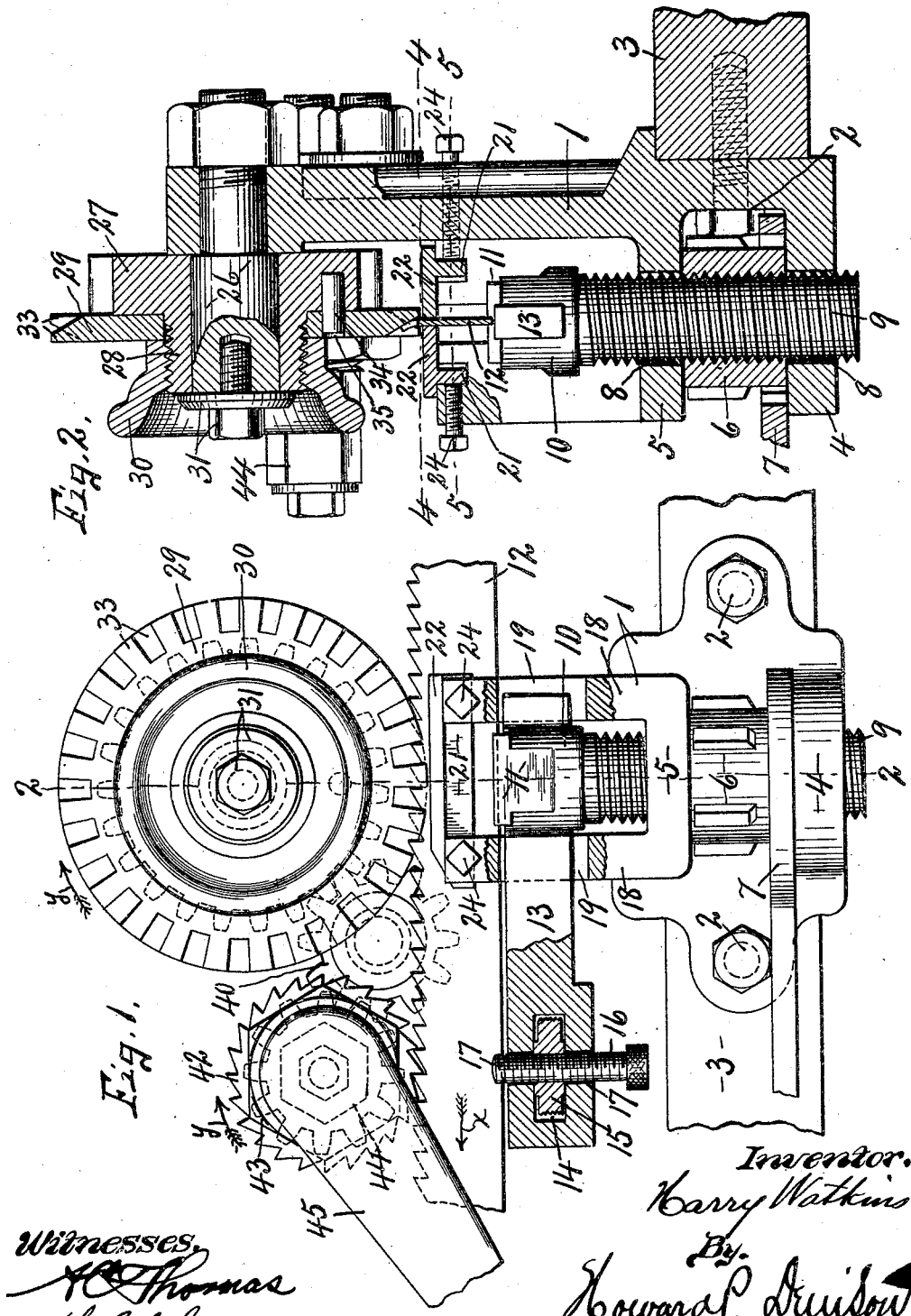

UNITED STATES PATENT OFFICE.

HARRY WATKINS, OF UTICA, NEW YORK, ASSIGNOR OF ONE-HALF TO DELOS DE WOLF SMYTH, OF UTICA, NEW YORK.

SAW-SETTING MACHINE.

937,903.  Specification of Letters Patent.  Patented Oct. 26, 1909.

Application filed July 10, 1907. Serial No. 382,991.

*To all whom it may concern:*

Be it known that I, HARRY WATKINS, of Utica, in the county of Oneida, in the State of New York, have invented new and useful Improvements in Saw-Setting Machines, of which the following, taken in connection with the accompanying drawings, is a full, clear, and exact description.

This invention relates to certain improvements in saw setting machines of the class set forth in the patent to Watkins and Dye, No. 839,909, issued January 1, 1907 and is particularly useful in setting the teeth of band saws.

The main object of my present invention is to provide adjustable means for frictionally holding and guiding the saw close to the saw setting teeth to prevent buckling or kinking of the blade during the setting operation and at the same time to prevent lateral springing of the blade so that the setting of the teeth will be more permanent in a single setting operation without necessitating a repetition of the operation.

Other objects and uses will be brought out in the following description.

In the drawings,—Figure 1 is a side elevation, partly in section of a saw setting machine embodying the various features of my invention. Fig. 2 is a sectional view taken on line 2—2, Fig. 1. Fig. 3 is a top plan partly in section of the same device, and Figs. 4 and 5 are horizontal sectional views taken respectively on lines 4—4 and 5—5, Fig. 2.

In carrying out the objects stated I provide a suitable upright supporting frame —1— which is adapted to be secured by any suitable fastening means as bolts —2— to a bench or other available support —3—. The base of this frame —1— is provided with laterally projecting flanges —4— and —5— spaced apart for receiving between them a nut —6— and operating lever —7—. These flanges —4— and —5— are formed with vertically alined openings —8— registering with the threaded aperture in the nut —6— for receiving a screw stud —9— which is adjustable vertically by means of the nut —6—. The upper end of the screw bolt —9— is provided with a head —10— having a slotted bearing —11— for receiving and guiding the lower edge of the saw —12— and also supporting an arm —13— which extends in the direction of movement of the saw —12—. The forward end of this arm —13— is provided with a transverse opening —14— for receiving a nut —15— which is engaged by a vertically adjustable screw —16—, the latter being guided in vertical openings —17— and being slotted at its upper end for receiving the back edge of the saw and further guiding it in its longitudinal movement. The upper flange —5— is provided with a pair of upright arms —18— at opposite sides of the screw head —10— and slotted longitudinally for receiving the adjacent end of the arm —13—, the slots as —19—, being somewhat longer vertically than the vertical width of the arm —13— to permit a limited vertical adjustment of the saw guides —11— and —17— for different widths of saws. The upper edges of the arms —18— are provided with a pair of forwardly converging grooves —20— located at opposite sides of and equi-distant from the slot in the saw guide —11— for receiving corresponding ribs —21— of adjustable clamping plates —22— which are adapted to frictionally engage opposite sides of the saw blade to guide and to hold the saw in its longitudinal movement against springing laterally or buckling during the setting operation. The meeting faces of these plates —22— are parallel and owing to the fact that their flanges —21— and the guides —20— taper or converge forwardly in the direction of the feed of the saw —12—, it is evident that by adjusting these plates forwardly, their meeting faces will be brought closer together and by adjusting them in the opposite direction, said meeting faces will be brought farther apart to accommodate them to different thicknesses of saws and also to vary the friction. These plates are held in their adjusted position by clamping screws —24— which are passed through threaded apertures in the upper ends of the arms —18— and engage the flanges —21— as best seen in Fig. 5.

Secured in the upper end of the upright frame —1— is a laterally projecting stud —26— upon which is journaled a gear —27— having a reduced threaded hub —28— for receiving a saw setting disk —29—, the latter being clamped in place against the adjacent face of the gear —27— by a hand nut —30— on the reduced threaded hub —28—, while the gear —27— is held upon the stud —26— by a removable cap screw —31—. The saw setting disk —29— is of such diameter that its lower side travels in close proximity to the upper faces of the plates —22— with the adjacent beveled sides of the saw setting teeth as —33— in vertical registration with the meeting faces of said plates and also with the saw blade which is held between the plates against lateral movement. The saw setting disk —29— is of the usual type having the outer faces of opposite teeth beveled in opposite directions so as to set alternate teeth of the saw in opposite directions as the disk is rotated and the saw fed longitudinally along the guides —11— and —17— and between the plates —22—.

By arranging the plates —22— in close proximity to the lower side of the saw setting disk, and making them adjustable, it is obvious that the saw blade will be prevented from lateral springing, kinking or buckling during the operation of setting the teeth and although I have described a specific construction for effecting this result it is evident that other equivalent mechanisms may be employed without departing from the spirit of this invention.

The disk —29— is made removable from the hub —28— by simply removing the hand-nut —30— but is held from rotation by a stud —34— projecting from the gear —27— into an aperture —35— in the disk.

The upright frame —1— is provided with a laterally projecting arm —36— having secured thereto, a pair of studs —37— and —38— upon which are loosely journaled intermeshing spur gears —39— and —40—, the latter meshing with the gear —27—. The gear —39— is provided with a reduced threaded hub —41— receiving a saw feeding toothed disk —42— which is clamped in place against the adjacent face of the gear —39— by a lock nut —43— on the hub —41—. This hub —41— is provided with an angular extension —44— for receiving a hand-crank —45— and is held upon the stud —37— by a cap screw —46—. The teeth of the disk —42— are spaced to correspond with and engage the teeth of the saw —12— to feed the latter in the direction indicated by arrow —X—, Fig. 1, said disk together with the gear —39— being rotated by means of the crank arm —45— and rotary motion is transmitted from the gear —39— by the idler —40— to the gear —27— and saw setting disk —29—, so that both of the disks —39— and —29— are rotated in the same direction, the teeth of the saw setting disk corresponding to and aiding in the feeding of the teeth of the saw in the direction of arrow —X— as said disks are rotated.

In operation, the saw —12— is placed in position in the guides —11— and —17— which are adjusted by means of the screws —9— and —16— to bring the teeth of the saw into proper relation with the saw setting disk —29— and saw feeding disk —39—, and the guide plates —22— are then adjusted to engage opposite faces of the blade of the saw by simply loosening the screws —24— and sliding the blades —22— endwise to their proper positions, after which the screws are tightened to hold the plates in place. Now by rotating the crank arm —45— in the direction indicated by arrow —y—, Fig. 1, the saw —12— will be fed in the direction indicated by arrow —X— and at the same time the saw setting disk will be simultaneously rotated to engage its beveled teeth with those of the saw thereby setting alternate teeth of said saw in opposite directions.

What I claim is:

1. In a saw setting machine, means for frictionally holding and guiding the saw to prevent buckling of the blade during the setting operation, said means comprising a vertically adjustable member provided with a head having a slotted bearing for receiving the edge of the saw, said slotted bearing extending tangentially with respect to the periphery of a saw setting disk, a support for said member, a vertically disposed yoke mounted upon said support and having arms, one arranged at each side of and projecting above the head, and adjustable guide plates for the saw, said guide plates mounted in the arms of the yoke and arranged above the head.

2. In a saw setting machine, means for frictionally holding and guiding the saw to prevent buckling of the blade during the setting operation, said means comprising a vertically adjustable member provided with a head having a slotted bearing for receiving the edge of the saw, said slotted bearing extending tangentially with respect to the periphery of a saw setting disk, supporting means for said member, a vertically extending lug mounted upon said supporting means and having its arms, one arranged at each side of and projecting above the head, and adjustable guide plates for the saw, said guide plates mounted in the said arms and arranged above the head, and means engaging with said member for adjusting it.

3. In a saw setting machine, means for frictionally holding and guiding the saw to prevent buckling of the saw during the setting operation, said means comprising a vertical member provided with a head at its upper end, a slotted bearing carried by the head, said slotted bearing adapted to receive the lower edge of the saw and extending tangentially with respect to the periphery of a saw disk, supporting means for said member, adjustable guide plates for the saw, said guide plates arranged in operative relation with respect to said slotted bearing, and supporting means for the guide plates, said supporting means for the guide plates mounted upon the supporting means for said member.

4. In a saw setting machine, means for frictionally holding and guiding the saw to prevent buckling of the saw during the setting operation, said means comprising a vertical member provided with a head at its upper end, a slotted bearing carried by the head, said slotted bearing adapted to receive the lower edge of the saw and extending tangentially with respect to the periphery of a saw disk, adjustable guide plates for the saw, said guide plates arranged in operative relation with respect to said slotted bearing, supporting means for said member, supporting means for the guide plates said supporting means for the guide plates mounted upon the supporting means for said member, and means for adjusting said vertical member.

In witness whereof I have hereunto set my hand this 2nd day of July 1907.

HARRY WATKINS.

Witnesses:
   MILDRED M. NOTT,
   C. M. McCORMACK.